Figure 1:
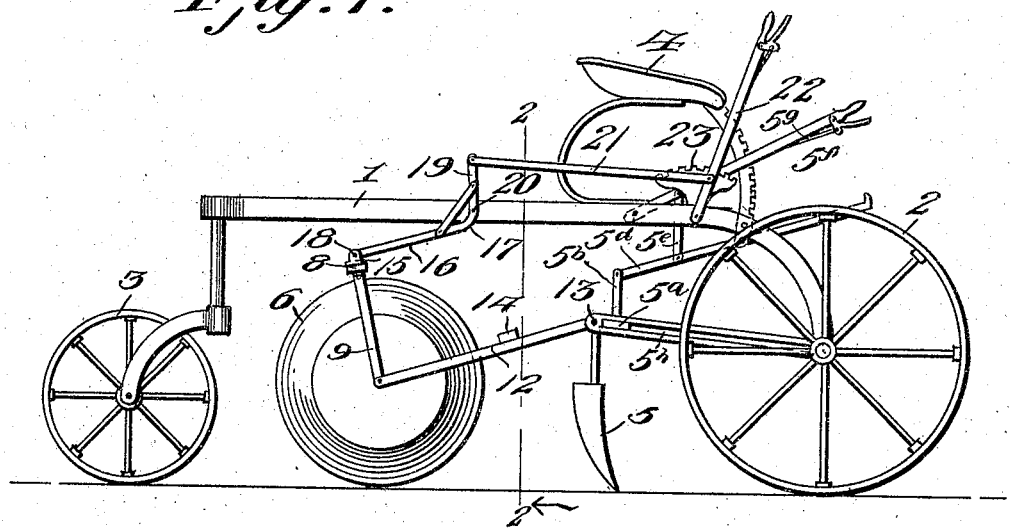

No. 815,048. PATENTED MAR. 13, 1906.
C. B. SMITH.
FURROW SMOOTHER AND PACKER.
APPLICATION FILED APR. 22, 1905.

Witnesses
Frank B. Hoffman
C. C. Hines

Inventor
Carroll B. Smith
By Victor J. Evans
Attorney

UNITED STATES PATENT OFFICE.

CARROLL B. SMITH, OF REDLANDS, CALIFORNIA.

FURROW SMOOTHER AND PACKER.

No. 815,048.     Specification of Letters Patent.     Patented March 13, 1906.

Application filed April 22, 1905. Serial No. 256,967.

*To all whom it may concern:*

Be it known that I, CARROLL B. SMITH, a citizen of the United States, residing at Redlands, in the county of San Bernardino and State of California, have invented new and useful Improvements in Furrow Smoothers and Packers, of which the following is a specification.

This invention relates to a furrow smoothing and packing attachment for plows or ditching machines employed for forming furrows or ditches for irrigating purposes, the object of the invention being to provide a furrow smoothing and packing device whereby the walls of the furrows may be smoothed or packed, as desired, said device being controllable to permit the operator to regulate the pressure as desired and to also elevate the device to leave portions of the furrows unsmoothed or in their normal condition as formed by the plows of the ditcher, whereby the flow of water may be more readily controlled to effect its uniform distribution over the land.

Referring to the drawings, the invention is illustrated in connection with and as an attachment for a wheeled plow or other agricultural implement; but the invention is not limited to use therewith, as it may be employed in connection with or may be attached to any suitable apparatus.

Figure 2:
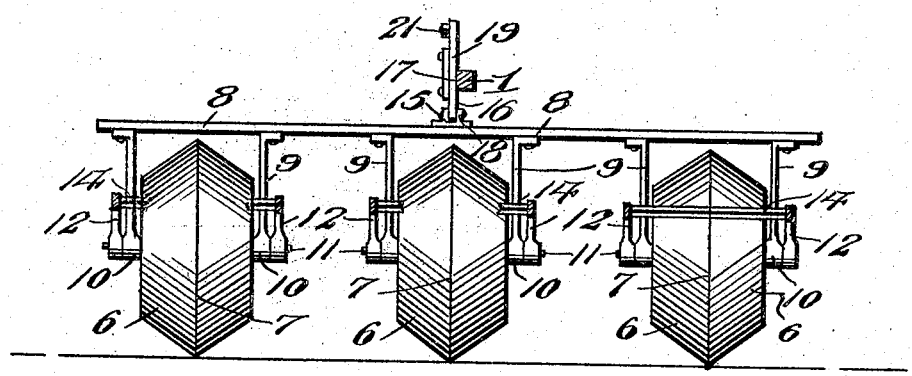

Figure 1 is a side elevation of a plow provided with my improved furrow smoothing and packing device, and Fig. 2 is a section taken transversely through the device on the line 2 2 of Fig. 1.

The numeral 1 designates an agricultural implement or plow provided with front supporting-wheels 2, a rear caster or trail wheel 3, a seat 4, and one or more shares or furrow-formers 5.

The shares 5 may be adjustably mounted so that they may be raised and lowered to throw them out of and into operation when desired. In the present instance the shares are shown supported by a transverse beam 5ª, from which extends an arm 5ᵇ, pivotally connected to a power-transmitting lever 5ᵈ, suitably mounted upon the frame, the said lever being in turn connected by a link 5ᵉ with an adjusting-lever 5ᶠ, by which the beam 5ª and the shares carried thereby may be raised and lowered. The lever 5ᶠ is provided, as usual, with a pawl or dog 5ᵍ to lock it in adjusted position. The beam 5ª may be pivotally connected with the frame in any preferred manner, as by means of one or more arms or links h, pivotally engaging the axle of the front wheels 2.

Arranged in rear of the shares 5 are furrow smoothing and packing rollers 6, each of which is formed with a V-shaped or tapered periphery 7, corresponding to the form of furrow made by the share and adapted to smooth and pack the walls thereof. These rollers are mounted partly or wholly independently of the shares, so that they may be adjusted to vary their pressure and to throw them into and out of contact with the walls of the furrows.

Arranged below the body of the frame of the agricultural implement or plow 1 is a cross-bar 8, to which are fixed pairs of depending hangers 9, formed at their lower ends with bearings 10 for the reception of the journals of axles 11, on which the rollers 6 are revolubly mounted. The ends of these axles are extended and pivotally connected with the rear ends of hanger bars or links 12, pivoted at their forward ends, as indicated at 13, to the beam 5ª, supporting the shares 5, each pair of links 12 being respectively connected and braced by cross-bars 14.

The cross-bar 8 is provided intermediate of its length with a bracket 15, having spaced ears for the reception of the free end of the lower rear arm 16 of a bell-crank lever 17, said arm being pivoted to the bracket by a pin, bolt, or other pivotal connection 18. The other arm 19 of the bell-crank lever normally stands vertically, and the lever is pivotally mounted at the junction of its arms upon the frame 1 by a suitable pivotal connection 20. A rod 21 pivotally connects the arm 19 with an operating-lever 22, mounted on the frame 1, which lever is provided with a pawl or dog (not shown) to engage a rack 23, fixed to the frame, whereby the lever may be fastened in adjusted position.

By means of the lever 22 and the intervening connecting-rod 21 the bell-crank lever 17 may be rocked upon its pivotal connection 20 to raise or lower the bar 8, and consequently the rollers 6, the latter swinging on the support formed by the bars or links 12, which turn on the pivotal connection 13. It will thus be readily understood that the rollers may be elevated or depressed to throw them into and out of the furrow and to regulate their pressure against the walls of the furrows as desired.

In operation the implement is suitably drawn or forced in the desired direction over the surface of the ground, and the shares 5 operate to form the furrows, the walls of the furrows being smoothed and packed by the following smoothing-rollers 6. In forming furrows for irrigation purposes it is desirable to sometimes smooth and pack the walls of the furrows to facilitate the flow of water and at other times to pass over portions of the furrows without smoothing or packing the walls thereof in order to cause the water from the point of inlet to be distributed as uniformly as possible to the land throughout the length of the furrow; otherwise the major portion of the water will be absorbed by the freshly-turned earth of the furrows nearest the point of entrance of the water thereto.

By means of my invention, in which the smoothing and packing rolls are adjustable independently of the shares, the rolls may be raised and lowered without interfering with the action of the shares and the pressure of the rolls against the walls of the furrows regulated to the desired degree to simply smooth off or densely pack the earth to effect a proper distribution of the water. The first or upper half of each furrow may therefore be conveniently smoothed or packed, so that too much water will not be absorbed thereby, while the remaining half of the furrow, which ordinarily gets the least amount of water, may be left rough and lumpy by simply lifting the smoothing-roller in order that the water may be quickly taken up thereby and its proper distribution throughout the length of the furrow consequently insured.

From the foregoing description, taken in connection with the accompanying drawings, the construction and mode of operation of the invention will be understood without a further extended description.

Changes in the form, proportions, and minor details of construction may be made within the scope of the invention without departing from the spirit or sacrificing any of the advantages thereof.

Having thus described the invention, what is claimed as new is—

1. A furrow forming, smoothing and packing device comprising a supporting-frame, a furrow-digger carried by said frame, a furrow smoothing and packing roller arranged to follow in the path of the digger, said roller having a periphery corresponding in form to the shape of the furrow produced by the digger, means for raising and lowering the digger, and means whereby an operator seated on the frame may adjust the roller independent of the digger to regulate the pressure of said roller at any time on the walls of the furrow.

2. A furrow forming, smoothing and packing device comprising a wheeled supporting-frame, a plurality of furrow-diggers carried by said frame, means for raising and lowering the diggers in unison, a plurality of furrow smoothing and packing rollers arranged to follow in the path of the furrow-diggers, said rollers having peripheries corresponding in form to the shape of the furrows produced by the diggers, and means for adjusting the rollers in unison independent of the diggers, said means being arranged to permit the rollers to be controlled by an operator seated on the frame to vary their pressure at any time upon the walls of the furrows.

3. A furrow forming, smoothing and packing device comprising a wheeled supporting-frame, a transverse beam carried by said frame, furrow-diggers carried by the beam, means for adjusting the beam to raise and lower the diggers, furrow smoothing and packing rollers arranged to follow the diggers and pivotally connected with the beam, said rollers having peripheries corresponding in form to the shape of the furrows produced by the diggers, and means for adjusting the rollers independently of the beam and diggers, whereby the pressure of said rollers upon the walls of the furrows may be regulated and varied at any time.

4. A furrow forming, smoothing and packing device comprising a wheeled supporting-frame, a cross-beam pivotally mounted upon said frame, furrow-diggers carried by said beam, means for raising and lowering the beam to adjust the diggers, furrow smoothing and packing rollers arranged in rear of the diggers and pivotally connected with the beam, said rollers being connected for simultaneous adjustment, and means under control of an operator seated on the frame for raising and lowering said rollers to vary their pressure at any time upon the walls of the furrows.

5. A furrow forming, smoothing and packing device comprising a wheeled supporting-frame, a digger carried by said frame, a furrow smoothing and packing roller arranged to follow in the path of the digger, and independent adjusting means for the digger and roller arranged to be actuated by an operator seated on the frame, whereby the roller may be adjusted while the digger is in action to vary its pressure upon the walls of the furrow.

In testimony whereof I affix my signature in presence of two witnesses.

CARROLL B. SMITH.

Witnesses:
CHAS. E. TRUESDELL,
M. BAUDHOLTZ.